Sept. 24, 1957     A. W. TEGELER     2,807,381
BOAT TRAILERS

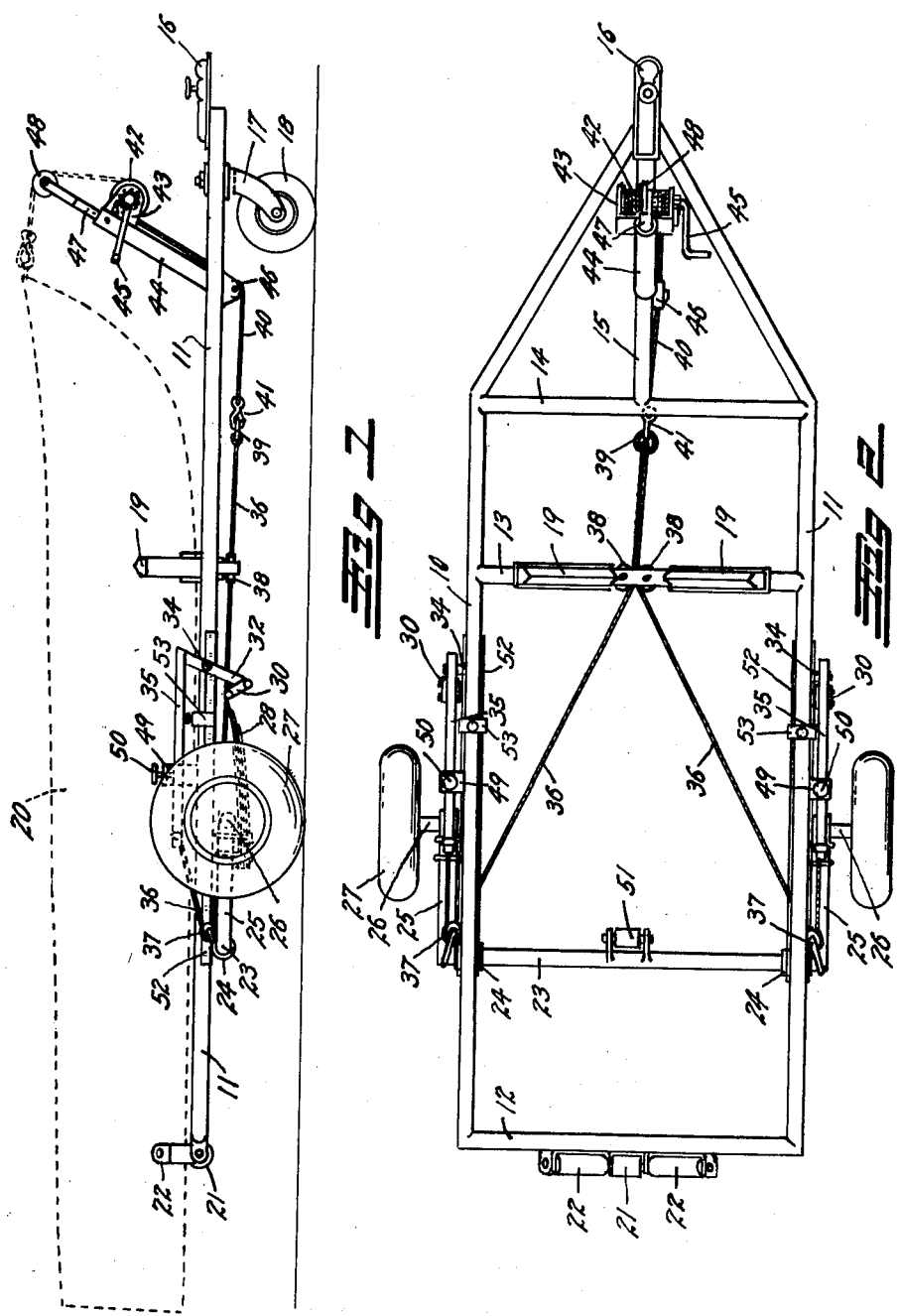

Filed Jan. 12, 1956     2 Sheets-Sheet 2

INVENTOR.
ALBERT W. TEGELER
BY
ATTORNEY

United States Patent Office 2,807,381
Patented Sept. 24, 1957

2,807,381

BOAT TRAILERS

Albert W. Tegeler, Denver, Colo.

Application January 12, 1956, Serial No. 558,779

4 Claims. (Cl. 214—506)

This invention relates to a boat trailer, that is to a vehicle for towing a boat in the rear of an automotive vehicle and has for its principal object the provision of a trailer of this character which will be relatively light in weight and which will provide secure and safe transportation for relatively large boats.

Another object is to so construct the trailer that one man can safely launch the boat directly into the water and raise the boat from a floating position in the water to a towing position behind the vehicle without outside assistance.

A further object is to provide resilient means for lifting or lowering the boat so as to prevent damage to the boat from injurious impacts and stresses and to provide spring cushioned transportation of the boat.

A still further object is to provide a boat trailer of this type with a cable reel which can be used for the double purpose of pulling the boat onto the trailer and for lifting the trailer to the traveling position after the boat is in place thereon.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevational view of the improved boat trailer in the elevated or transporting position;

Fig. 2 is a top plan view thereof;

Figure 3:
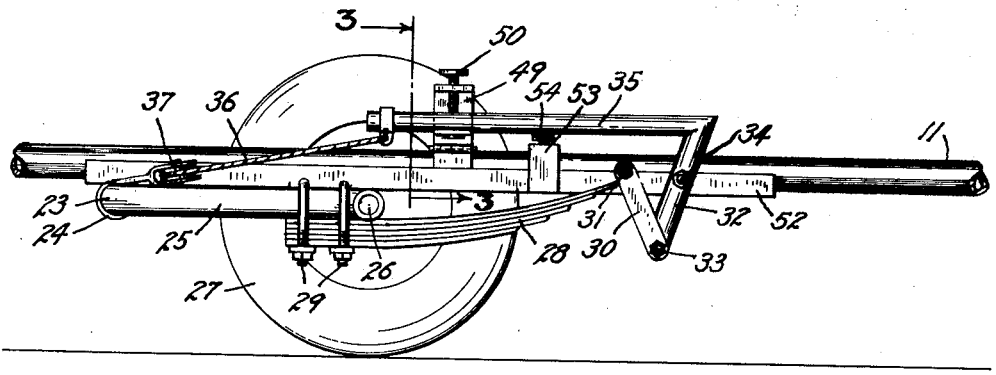
Fig. 3 is an enlarged fragmentary side view with the rear wheel removed, illustrating the trailer lifting mechanism in the elevated position.

The improved trailer employs a relatively flat frame formed from two longitudinally-extending side frame tubes 10 and 11 which are fixedly maintained in spaced relation by means of a rear cross tube 12, a medial cross tube 13 and a forward cross tube 14. The forward extremities of the side frame tubes 10 and 11 are bent inwardly at their forward extremities and are welded or otherwise secured to the opposite sides of a tongue tube 15. The rear extremity of the latter tube is supported from the forward cross tube 14.

The tongue tube 15 is provided at its forward extremity with a suitable conventional trailer hitch 16 by means of which it may be secured to a conventional tow ball on any towing vehicle. The tongue tube 15 is also provided with a castor wheel bracket 17 in which a pneumatically-tired castor wheel 18 is mounted for supporting the forward extremity of the frame when the latter is free from the towing vehicle.

The medial cross tube 13 is provided with adjustable keel blocks 19 designed to be adjusted to support the bow of a boat such as indicated at 20 in Fig. 1.

The rear cross tube 12 is provided with a medially positioned keel roller 21 and with two inclined bottom rollers 22 which can be adjusted in any desired manner for engaging the bottom of the stern portion of the boat 20.

The above described frame is supported upon a longitudinally adjustable chassis consisting of two side channel members 52 in which the side frame tubes 10 and 11 rest. Each channel member is provided with a yoke 53 which extends over the side frame member which is positioned in the channel. The yokes 53 are provided with set screws 54 which can be tightened against the side frame members to prevent relative longitudinal movement between the channel members and the side frame members. The channel members are interconnected by means of a tubular shaft 23 which extends between and beneath the channel members 52 and is rotatably mounted in bearing sleeves 24 welded or otherwise secured beneath the members 52. A wheel lever 25 is fixedly attached to or mounted on each extremity of the shaft 23 and extends forwardly therefrom. The wheel levers are welded or otherwise secured to the shaft 23 in alignment with each other.

A wheel axle spindle 26 is welded or otherwise secured to the forward extremity of each wheel lever 25 and extends horizontally outwardly therefrom to provide an axle for a pneumatically-tired ground-engaging wheel 27. A plural-leafed spring 28 is secured to the forward extremity of each wheel lever 25, by means of suitable U-bolts 29, and extends forwardly and upwardly therefrom.

The forward extremity of each of the springs 28 terminates between the upper extremities of a pair of spring shackles 30 to which it is secured by means of a spring pivot bolt 31. The lower extremities of the spring shackles 30 of each pair extend on opposite sides of a short lever arm 32 to which they are pivotally secured by means of a shackle bolt 33. The short lever arms 32 are pivotally mounted intermediate their extremities on lever bolts 34 by means of which they are pivotally attached to the sides of the channel members 52.

A frame lifting lever 35 is secured to or formed on the upper extremity of each lever arm 32 and extends rearwardly therefrom at an acute angle to the latter. The frame lifting levers may be drawn rearwardly and downwardly in any desired manner. It is preferred, however, to attach a lever cable 36 to the rear extremity of each lifting lever. The two lever cables 36 are trained about guide pulleys 37, secured to the channel members 52 below the rear extremities of the levers 35, thence forwardly beneath the frame between a pair of pulleys 38, mounted beneath the medial cross tube 13, terminating in a cable ring 39 to which a hoist cable 40 may be attached by means of a hook device such as a harness snap 41.

The hoist cable 40 extends forwardly beneath, thence upwardly from a guide pulley 46 and is reeled upon a cable reel 42 which is mounted in a reel bracket 43 supported on a tubular reel post 44. The reel 42 is of any conventional variety provided with a hand crank 45 and with any of the usual ratchet and pawl devices for preventing reverse rotation of the reel when desired. The reel post 44 is fixed to and extends upwardly and forwardly from the rear extremity of the tongue tube 15 and telescopically receives an extension post member 47 provided with an upper cable pulley 48 the height of which may be varied by varying its position in the post 44.

The frame lifting levers 35 may be locked in their lowered position by means of inverted L-shaped clamps 49, hinged or otherwise secured to the channel members 52. The clamps 49 may be swung over the lowered levers 35, and the latter can be clamped in place in the clamps by means of suitable clamp screws 50.

Let us assume that it is desired to launch the boat 20. The flat frame is backed into the water until the boat is positioned thereover. The hoist cable 40 is secured to the lever cables 36, the crank 45 is rotated to take the load from the clamps 49, and the latter are released from the levers 35. The reel 42 is now reversed to slacken the cables and allow the levers 35 to swing upwardly from the position of Fig. 3 toward the position of Fig. 4. This allows the tubular cross shaft 23 to swing downwardly about the axis of the axle spindles 26 as the forward extremities of the springs 28 swing upwardly. This lowering movement continues until the lower extremity of the frame rests upon the ground. This allows the boat to be easily floated into the water.

To retrieve the boat, the hoist cable 40 is trained over the upper pulley 48 and attached to the bow. The reel 42 is rotated to draw the boat into position over the flat frame. The hoist cable 40 is then disconnected from the boat, passed beneath the lower guide pulley 46 and attached to the cable ring 39 of the lever cables 36. The reel 42 is now operated to draw the lifting levers 35 rearwardly and downwardly, from the position of Fig. 4 to the position of Fig. 3. The levers 35 are now clamped in place by means of the clamps 49 and screws 50 and the trailer is ready to travel. The hoist cable 40 may be returned to the bow of the boat and pulled tight by means of the cable reel 42 to act to tie the boat to the trailer to prevent relative longitudinal movement therebetween.

Figure 4:
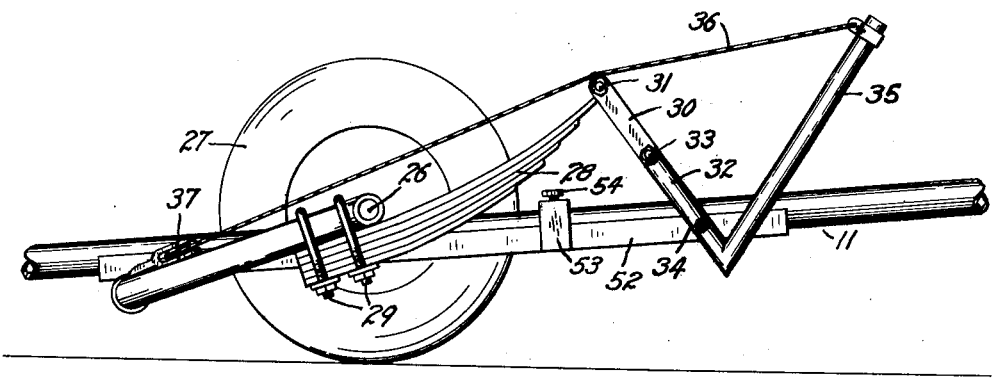
Fig. 4 is a similar enlarged fragmentary side view illustrating the trailer lifting mechanism in the lowered or launching position.
Figure 5:
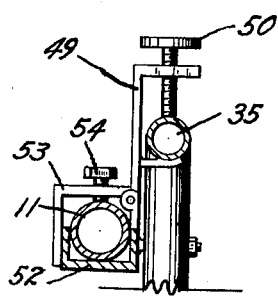
Fig. 5 is a cross-section, taken on the line 5—5, Fig. 3.

If desired, a second keel roller 51 may be mounted on and at the middle of the cross shaft 23 so that it will swing upwardly into contact with the keel of the boat when the shaft 23 rotates to the position of Fig. 4 to assist in removing and replacing the boat.

It is desired to call particular attention to the longitudinally shiftable supporting chassis comprising the channel members 52 to which the ground engaging wheels 27 and the lifting and lowering leverage elements are attached. This feature provides an adjustable balance which enables the weight of the boat, regardless of its length, to be balanced over the wheels 27 to facilitate manual handling of the loaded trailer when the latter is detached from the towing vehicle. It also allows the weight upon the trailer hitch 16 to be quickly and accurately adjusted to obtain maximum towing efficiency.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A boat trailer comprising; a relatively flat frame including a pair of laterally spaced side members, the said frame being supported upon a longitudinally adjustable chassis consisting of two side channel members in which the said side members rest, a bearing member rigidly supported by each channel member adjacent the rear end thereof, a shaft extending transversely of the frame beneath said channel member and rotatably supported in said bearing members, a pair of forwardly projecting wheel levers disposed laterally outwardly of said channel members and having corresponding ends thereof rigidly secured to the opposite ends of said shaft, a wheel axle rigidly supported by the opposite end of each wheel lever and projecting laterally outwardly therefrom, a wheel rotatably supported on each axle, a pair of leaf springs having corresponding ends thereof secured to the respective wheel levers adjacent said axles, and means connected to the opposite ends of said springs including a lever pivotally supported on each channel member adjacent the forward end thereof.

2. A boat trailer according to claim 1, wherein each of said channel members is provided with adjustable means engageable with said frame side members for effecting longitudinal adjustment of the chassis.

3. A boat trailer according to claim 1 wherein said last named levers each include a relatively long leg and a relatively short leg in angular relation thereto, said pivotal supports of said last levers being in said short legs, and said means comprising shackles having adjacent ends thereof pivotally connected to said springs and their opposite ends pivotally connected to said short legs.

4. A boat trailer according to claim 1 wherein said frame includes a rear transverse member, a front transverse member and an intermediate transverse member, a reel supported by said frame in advance of said front transverse member and having a pair of cables wound thereon the ends of which are connected to said wheel levers, said intermediate transverse member being provided with a pair of pulleys beneath same for guiding said cables, said intermediate transverse member being further provided with a pair of vertically adjustable keel blocks, and said rear transverse member being provided with a medially positioned horizontal keel roller and a roller at each end thereof inclined to the horizontal for the purpose set forth.

References Cited in the file of this patent

UNITED STATES PATENTS

| | | |
|---|---|---|
| 2,453,388 | Schramm | Nov. 9, 1948 |
| 2,487,701 | Getz | Nov. 8, 1949 |
| 2,610,865 | Cantrell | Sept. 16, 1952 |
| 2,708,045 | Shontz | May 10, 1955 |
| 2,719,726 | Johnston | Oct. 4, 1955 |
| 2,736,568 | Martin | Feb. 28, 1956 |